United States Patent Office 3,551,825
Patented Dec. 29, 1970

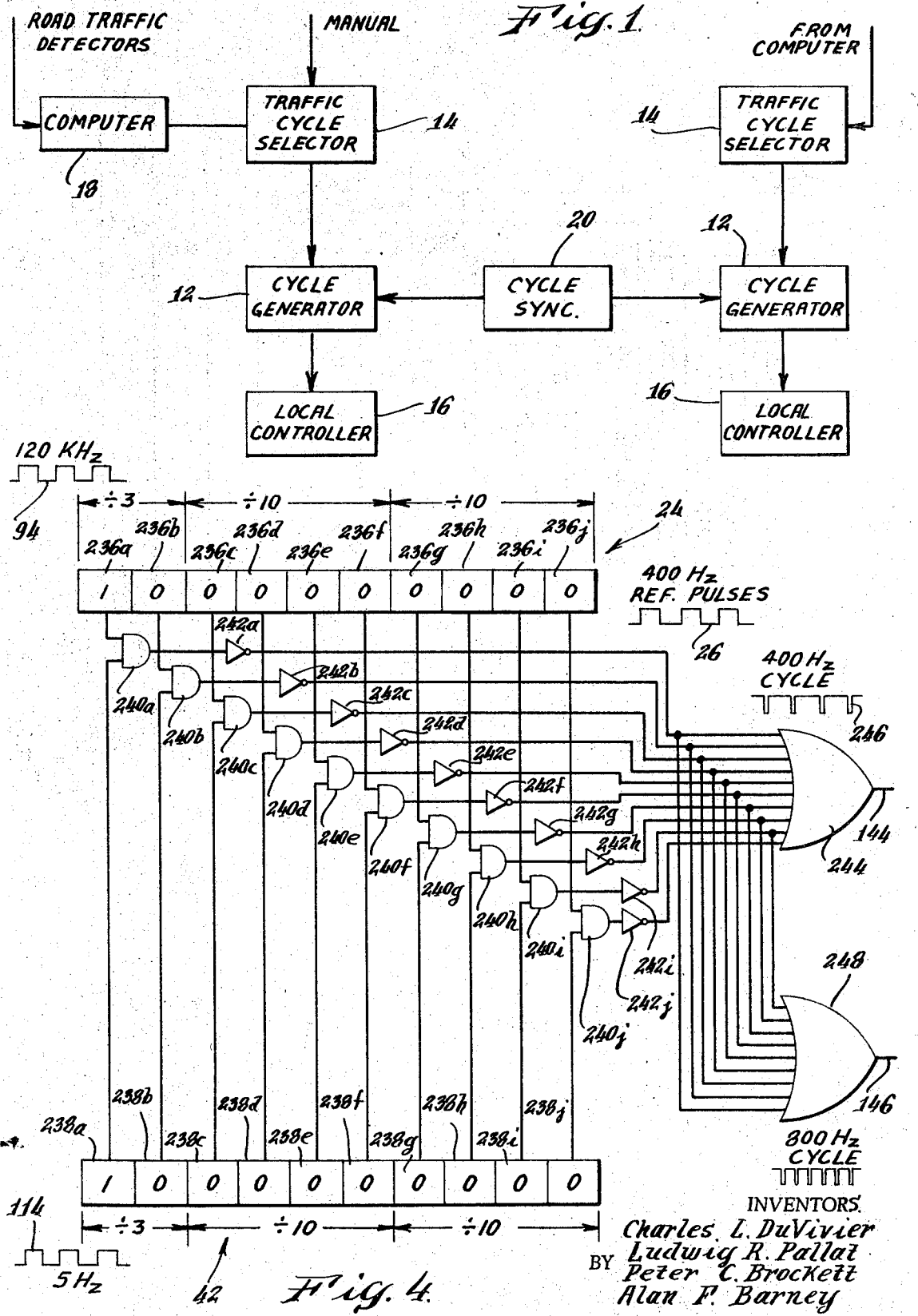

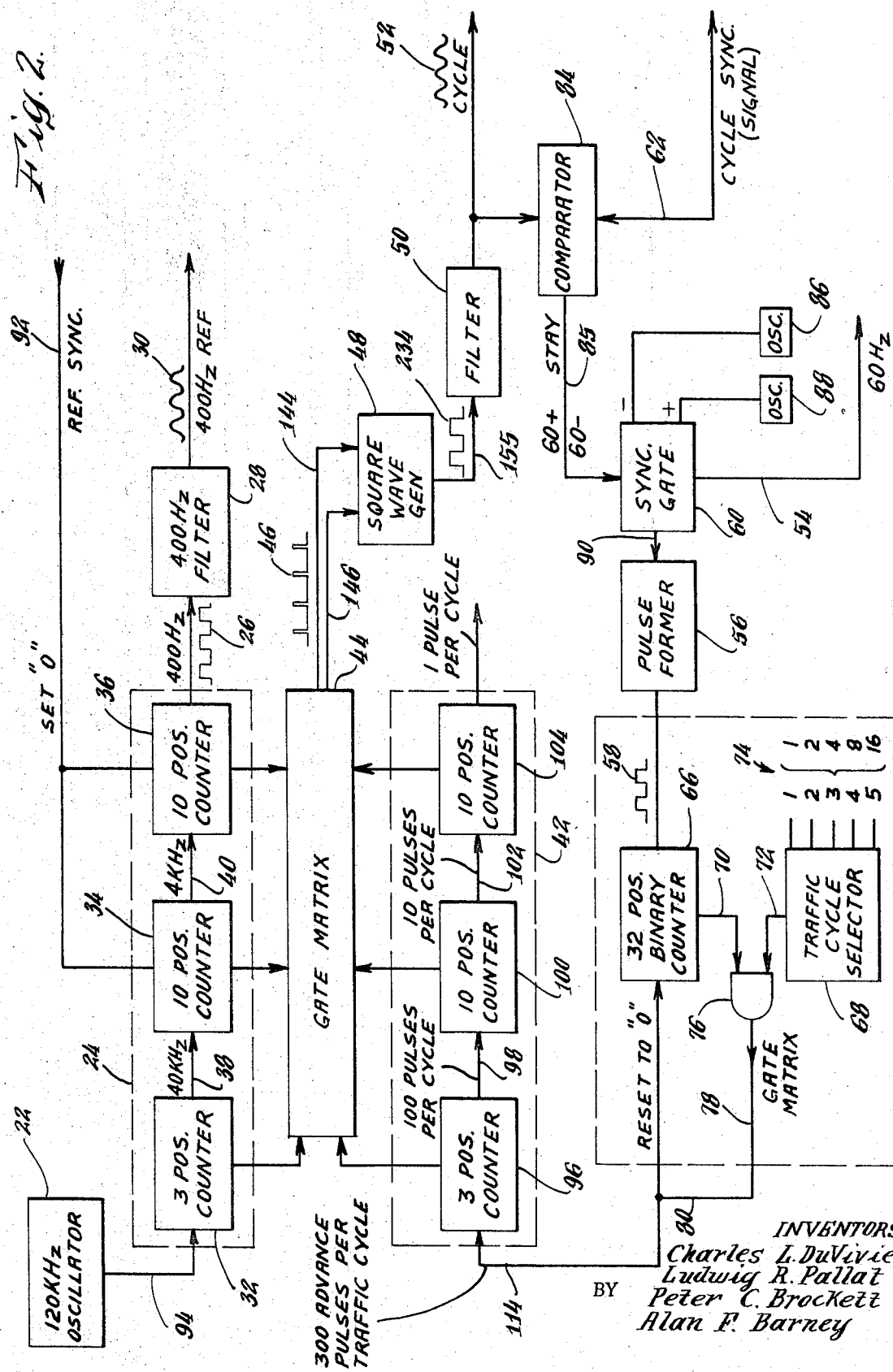

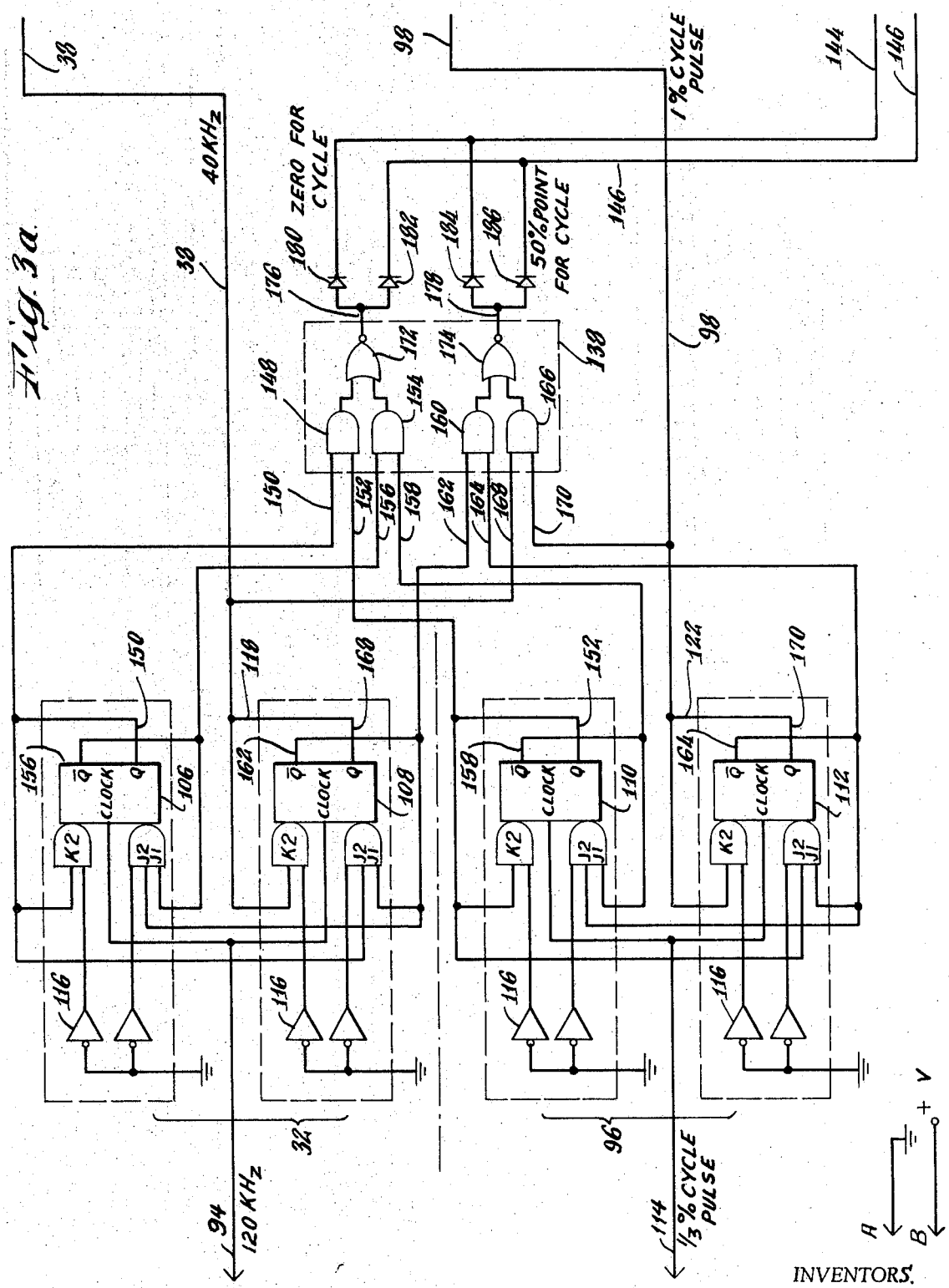

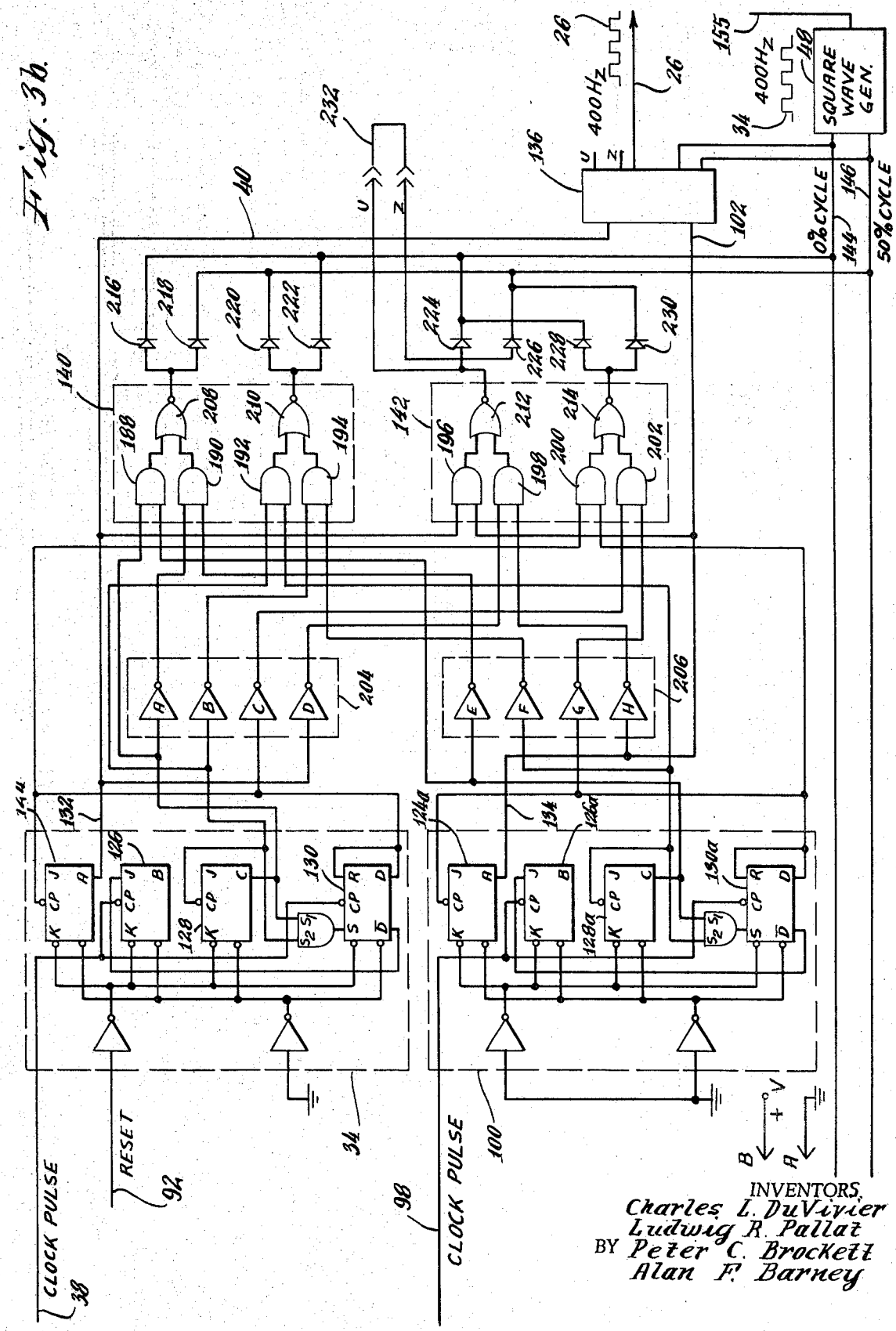

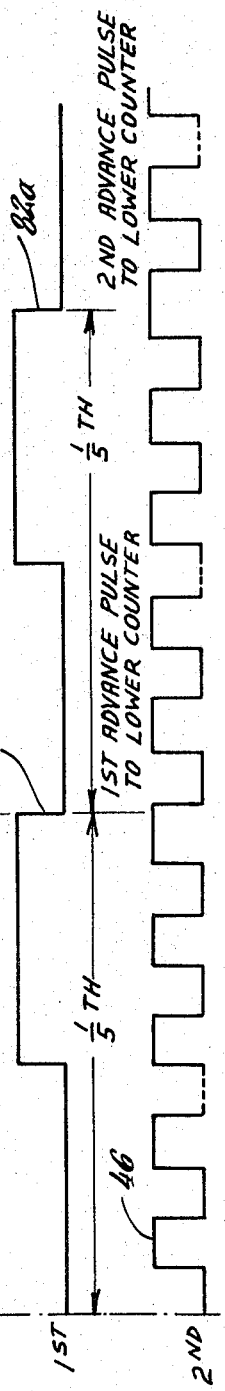
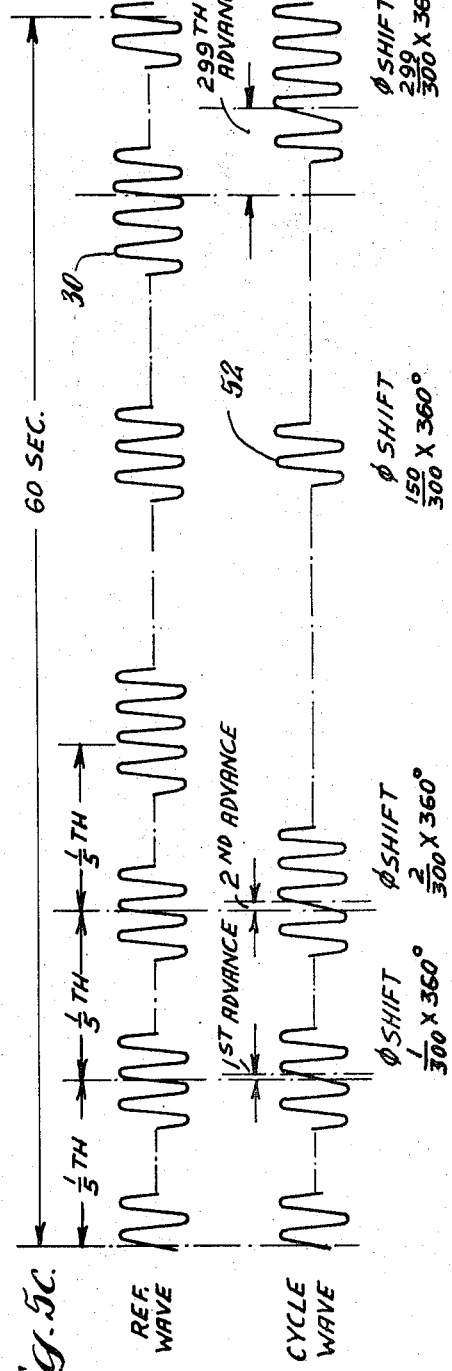

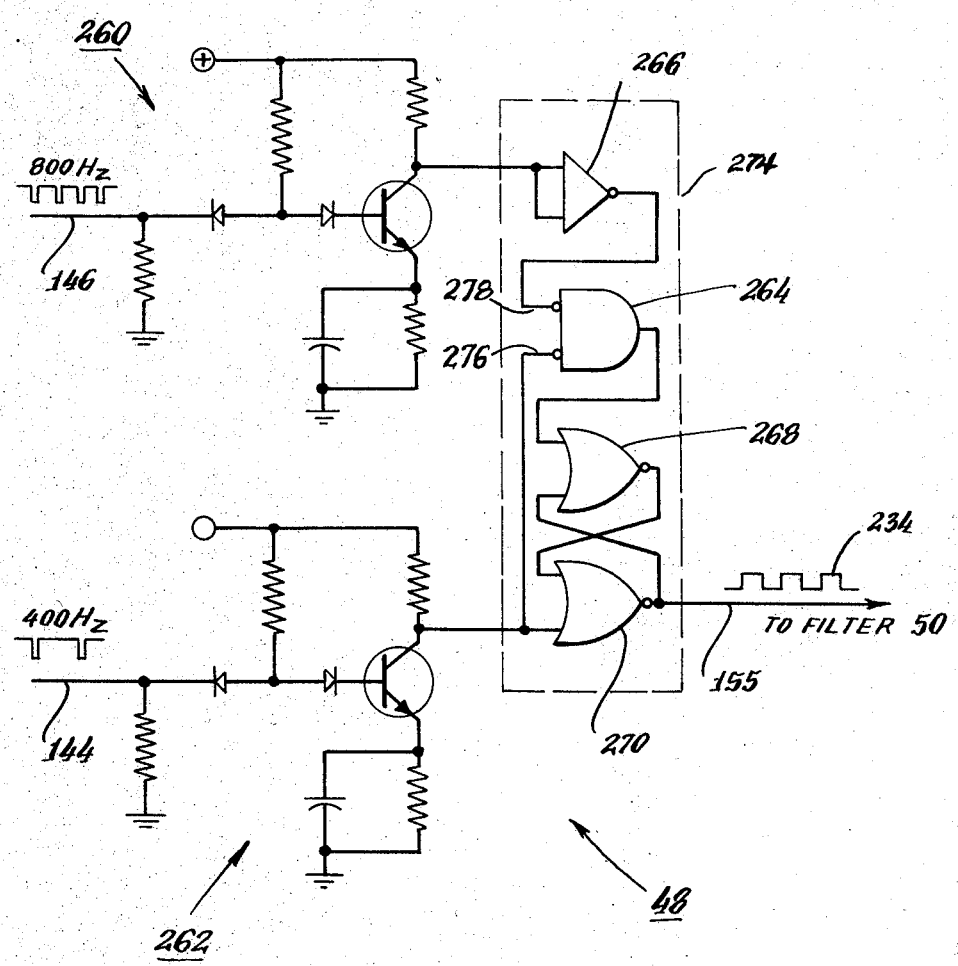

3,551,825
PHASE SHIFT CYCLE GENERATOR FOR A TRAFFIC CONTROL SYSTEM
Charles L. Du Vivier, Darien, Peter C. Brockett, Milford, Alan F. Barney, Bethel, and Ludwig R. Pallat, Stamford, Conn., assignors to LFE Corporation, Waltham, Mass., a corporation of Delaware
Filed Jan. 3, 1969, Ser. No. 788,870
Int. Cl. H03b 3/04
U.S. Cl. 328—155
8 Claims

ABSTRACT OF THE DISCLOSURE

An improved cycle generator for providing a signal control traffic cycle in a traffic control system. The cycle generator is adapted to produce two single phase wave energies of identical frequencies one derived from the other wherein one wave energy is adapted to incrementally shift in phase with respect to the other. The shifting wave energy is obtained by periodically generating a first pulse defining the start of each wave and a second pulse defining the midpoint of the wave and occurring in time midway between 2 adjacent starting pulses. The desired traffic control cycle is obtained between adjacent coincidences of the two wave energies which is equivalent to the time required for the shiftable wave energy to pass through 360° of phase angle with respect to the reference wave energy.

BACKGROUND OF THE INVENTION

In traffic control systems, the right of way between intersecting or otherwise conflicting paths of traffic is ordinarily sequentially accorded to one traffic path and then subsequently to the remaining path or paths before returning to the original path. The total time that elapses from the moment the right of way is first granted to an initial path until it returns to that path is referred to as the traffic cycle length and is generally of the order of 40 to 150 seconds.

Depending on the complexity of the traffic pattern being controlled, the traffic control system may utilize one or more local controllers that generate local time cycles at predetermined points in a master time cycle that is generated by a master controller. The local controllers also include apparatus for switching traffic signals at various points in time in the traffic cycle, and in this regard may be thought of as generating their own local cycle lengths during the course of a predetermined portion of the master cycle length.

It has heretofore been known to generate and time such traffic cycle lengths either in a master or local controller by measuring the time lapse between the coincidence points of two wave energies of dissimilar frequencies. Prior art generators of this type are described and disclosed in detail in U.S. Pat. No. 2,989,228 for Traffic and Other Control Systems and U.S. Pat. No. 3,241,104 for Traffic Control. In the main, such prior art cycle generators have operated on the principle that two wave energies of slightly differing frequencies will coincide in phase periodically at fixed intervals of time, the interval of time being determined by and inverse to the frequency difference between the two wave energies. Such prior art cycle generators, however, necessitate the use of multi-phase wave energies and electromechanical components to generate the desired time period.

In addition to the difficulty of accurately generating multiphase wave energies within the accuracy required for traffic control purposes and to the inherent drawbacks in the use of mechanical devices to precisely and continuously generate a timed cycle over long periods of time, such prior art cycle generators cannot readily be synchronized with other such generators nor are they readily compatible with digital circuitry outputs such as might otherwise be used to control the selection of the period of the traffic cycle as for example, if digital computers were utilized to alleviate traffic congestion problems. Further, there is no convenient and inexpensive means available for accurately timing the cycle lengths of such prior art generators. The present invention comprises an improvement in the means for generating the cycle wave energy and of synchronizing the cycle generator described and claimed in the commonly assigned application for Letters Patent filed Nov. 20, 1968 and bearing S.N. 777,-224 for Cycle Generator for a Traffic Control Unit.

SUMMARY OF THE INVENTION

It is therefore a principal object of the present invention to provide an improved cycle generator for use in a traffic control system which utilizes all solid state equipment to generate two single phase AC wave energies, one of which gradually shifts in phase in small incremental steps with respect to the other wherein the wave energies are designed to coincide at time intervals equal to the desired traffic cycle length.

It is a further object to provide such a cycle generator wherein one wave energy is derived from the other.

It is a further object of the present invention to provide such a cycle generator which may readily be brought into phase synchronization with other similar cycle generators, which is compatible with digital circuitry components and which may be clocked and timed from a standard 60 cycle AC power line.

These and other beneficial objects and advantages are attained in accordance with the present invention by generating two single phase wave energies from a common source and having one of the wave energies shift through 360° of phase angle incrementally with respect to the other during the course of the desired traffic cycle. The two wave energies are thus coincident in phase once during the period of time corresponding to a single traffic cycle and the time between adjacent coincidences is equivalent to the length of the traffic cycle.

The first or stationary wave energy may be thought of as a reference wave and, as a basis for the derivation of the second wave energy as discussed below, this reference wave energy is generated from a fixed high frequency crystal oscillator, the output of which has been stepped down by suitable counters and filters so as to produce a sinusoidal wave energy of the predetermined desired frequency.

The second wave energy or cycle wave energy is derived from gating circuitry designed to produce an output pulse each time the counter associated with the reference wave passes through a position which is identical to the position at which a second identical counter is maintained. Thus, as the pulses from the oscillator cause the first counter to sweep through its positions, at one position the first counter will correspond to the present position of the second counter and at that time the gating circuitry will produce a pulse which is subsequently transformed into the cycle wave energy. This will occur once during each complete sweep through the first counter and since the reference wave is also defined by a complete sweep through the first counter, the reference wave and cycle wave energies will be of identical frequencies. That is, the frequency of both the reference and cycle wave energies is determined by the number of times per second the first counter goes through all its positions.

The shifting phase relationship between the cycle and reference wave is obtained by periodically advancing the second counter so that the coincidence point between the first and second counters also advances. This causes a shift in the time at which coincidence takes place since it occurs at some other position of the counters with each advance pulse to the second counter. In other words, the 0 point of the cycle wave is caused to shift in time while the 0 point of the reference wave is kept constant, which is in effect a shifting of the phase angle between the two wave energies. Assuming that the cycle and reference waves were coincident in phase when the second counter was in its first position, phase coincidence will not reoccur until the second counter goes through all its positions and returns to its initial position. Thus, since the cycle length is determined by the time between coincidences of the two wave energies, the cycle length may be controlled by controlling the rate at which the second counter is advanced through its positions. This is independent of the frequency of the reference or cycle wave energy.

The advance pulses to the second counter are produced by a clock pulse generator means. In the preferred practice of the invention a 60 Hz. AC power line is utilized as a clock pulse source and selected subdivisions of the 60 Hz. source cooperate to provide the advance pulses.

BRIEF DESCRIPTION OF THE DRAWINGS

In the accompanying drawings:

FIG. 1 is a block diagram of a traffic control system utilizing a cycle generator produced in accordance with the present invention;

FIG. 2 is a block diagram of a cycle generator in accordance with the present invention;

FIGS. 3a and 3b illustrate a logic circuit for the counters and gate matrix utilized in the cycle generator of FIG. 2.

FIG. 4 is a simplified logic diagram which shows the manner in which the cycle wave producing pulses are generated;

FIGS. 5a through 5f schematically illustrate the pulse and wave forms developed in the cycle generator; and FIG. 6 is a schematic diagram of a preferred form of the logic circuitry for the square wave generator utilized in the present invention.

DESCRIPTION OF THE PREFERRED EMBODIMENT

The present invention is illustrated in the accompanying figures wherein similar components are indicated by the same reference numerals throughout. Reference is now made in particular to FIG. 1 wherein a traffic control unit 10 utilizing a cycle generator in accordance with the present invention is depicted. The cycle generator 12 is shown receiving input information relating to the desired traffic cycle length from a selector 14 and generating a signal corresponding to the start and completion of the chosen time cycle to one or more local traffic signal controllers as exemplified by local control 16. The local controller 16, in turn, may be positioned along a roadway or at an intersection or the like and serves to provide the sequential green, yellow, and red traffic signals which control the flow of traffic along the roadway. As shown, the input to selector 14 may be manual in which case the resultant cycle would be independent of traffic conditions along the roadway or the selector input may come from a computer 18 which in turn receives information from road detectors or other means relating to traffic conditions along a particular roadway or from several roadways.

In some instances, it may be desirable to synchronize the cycle lengths of several control units. To this end, a cycle synchronization block 20 is provided which receives information relating to the cycle length generated by one cycle generator which serves as a master unit and sends out signals to the other associated cycle generators which are to be brought into synchronization with the master unit. Such synchronization circuitry is used where it is sought to control the traffic flow along an artery extending through several intersections and it is desirable to coordinate the signals of the various local controllers along the artery. The means for affecting the synchronization of several units will be described forthwith.

Reference is now made to FIG. 2 wherein the cycle generator of the present invention is depicted in block diagram form. The cycle generator of this preferred embodiment serves to provide a first 400 Hz. sinusoidal wave energy which serves as a reference wave energy and which may be considered fixed with respect to its phase angle and a second 400 Hz. sinusoidal wave energy which serves as a cycle wave energy and constantly shifts in phase in discrete steps with respect to the reference wave energy. The cycle generator is utilized in a traffic control system which employs comparison means for comparing the reference and cycle wave energies and determines and responds to phase coincidences of the two wave energies. The coincidence of the wave energy is then used to define the start and completion points of the traffic cycle, for example.

The two wave energies are produced, one directly and one indirectly, from a fixed frequency crystal oscillator 22 which in this preferred embodiment has a frequency of 120 kHz. The output of oscillator 22 is selected so as to produce what is in effect a train of spikes occurring at a frequency rate of 120 K pulses per second. The pulses then pass through suitable logic circuitry in the form of a 300 position counter 24 which divides the input pulse train by 300 and produces a 400 Hz. square wave 26 which may be passed through a 400 Hz. bandpass filter 28 to produce the desired sinusoidal wave 30. The 300 position counter 24 comprises a 3 position counter 32, a first 10 position counter 34, and a second 10 position counter 36 connected in series. Thus, the output 38 of the 3 position counter 32 is a 40 kHz. square wave which is the input to the first 10 position counter 34 and the output 40 of the first 10 position counter is a 4 kHz. square wave which serves as the input to the second 10 position counter 36. The output of 10 position counter 36 is the 400 Hz. square wave 26.

A second 300 position counter 42 which is identical to the first 300 position counter 24 is also provided and is connected to the first counter by suitable logic circuitry comprising comparator gate matrix 44 so that each time the positions of the first and second 300 position counters 24 and 42 correspond identically, a pulse is generated. Since the first counter 24 goes through all of its 300 positions, each 1/400 of a second, for any fixed position of the second counter 42, the first counter 24 will reach that position once within each 1/400 of a second period, so that a pulse output 46 of the logic circuitry 44 will also occur each 1/400 of a second. The output 46 of the logic circuitry 44 after passing through a square wave generator 48 and a suitable bandpass filter 50 will thus also be a 400 Hz. sinusoidal wave 52 (referred to as the cycle wave). It should be readily apparent that for only one position of the second counter 42 will the cycle wave 52 be in phase with the reference wave 30 and that for the 299 other possible positions of the second counter 42, the cycle wave 52 will be out of phase in varying degree relative to the reference wave 30. In this regard, the first counter 24 is designed to produce an output pulse each time it counts to 300; thus, the cycle wave will be in phase with the reference wave only when the second counter 42 is also at 300 so that the cycle wave producing pulses 46 and reference wave producing pulses 26 coincide in time.

If at some particular time the second counter 42 were set at 150, the cycle wave would lead or lag the reference wave by 180°, since the cycle wave producing pulses will occur when the first counter 24 reaches 150 while the reference wave producing pulses will not occur until the counter 24 reaches 300. Similarly, if the second counter 42 were set at 75, the cycle wave would lag behind the reference wave by 90° and if the counter were set at 225, the cycle wave would lag behind the reference wave by 270°. In FIG. 5a the relative positions of the cycle wave producing pulses are depicted for the case where the second counter 42 is fixed at 300 so that the reference and cycle waves coincide and for the case where the second counter is fixed at 150 so that the cycle wave leads or lags the reference wave by 180°. Thus, each time the second counter 42 is advanced by an advance pulse to its next position, the phase angle between the reference wave and cycle wave will shift by 1/300 of 360°. Since the cycle wave shifts through 360° of phase angle each time the second counter 42 goes through its entire 300 positions and since coincidence takes place only once each time the second counter goes through all of its 300 positions (i.e., at the 300th position) the rate at which the second counter advances will determine the rate of phase shift of the cycle wave.

One convenient source of pulses to advance the second counter 42 which are accurately generated and readily available in most locations is a standard 60 Hz. power line. The 60 Hz. wave energy in order to be effectively utilized must first be transformed into a series of pulses, and to this end the 60 Hz. AC wave energy 54 is passed through a pulse former 56, the output 58 of which is a train of short duration pulses normally emanating at the rate of 60 pulses per second.

As previously mentioned, it may be desirable to bring "cycle" wave output 52 of the present cycle generator into phase synchronization with that of another similar cycle generator and thus the 60 Hz. wave energy 54 is first coupled as one input to a rate selector gate 60 with an alternate input applying a frequency of somewhat greater or less than 60 Hz. temporarily in place of the 60 Hz. wave energy 54 through gate 60 through line 90 in a manner to be described forthwith so as to bring the cycle output signal 52 of this cycle generator into phase synchronization with a cycle synchronizing signal on line 62, coming from the other generator, for example. Thus the comparator 84 compares the cycle signal output 52 of the present cycle generator with that on line 52 and via line 85 controls gate 60 so as to normally couple the 60 Hz. signal 54 to line 90 when the cycle output signal 52 is in synchronism with the cycle synchronization signal on line 62 but to control the gate 60 to substitute a frequency input somewhat higher or somewhat lower than 60 Hz. from the oscillator 88 or the oscillator 86 respectively through the gate 60 to line 90 depending on whether the comparator 84 senses that the cycle signal output 52 is lagging or leading in phase with respect to the cycle synchronization signal on line 62.

Assuming for the moment that the 60 Hz. wave energy 54 controls gate 60 so that 60 pulses per second are provided via former 56, then if these 60 pulses per second were passed directly to counter 42 as advance pulses, they would advance counter 42 through its entire 300 positions in five seconds. This period of time is far too short for traffic control purposes and hence the number of pulses passing to the lower counter must be reduced. A variable divider pulse circuit 64 provides pulses at the rate to advance counter 42 through its 300 positions in the desired traffic cycle. The pulse divider circuit 64 includes a 32 position binary counter 66 and a traffic cycle selector unit 68 which has inputs which may be made to correspond to any level of the counter 66 and cause it to stop at that point and reset to repeat its counting. Thus, counter 66 and selector unit 68 cooperate in defining a variable counter that counts up to a number predetermined by properly selecting the counter unit control 74. The outputs 70 and 72 of counter 66 and of the selector unit 68 are fed to AND gate 76 which allows a signal to pass only when the counter 66 has reached the position preselected in control unit 68. The output 78 of gate 76 is fed back to counter 66 and serves as a reset signal to the counter each time the desired level is reached. Thus, the selector unit 68 determines at which point in its count the 32 position binary counter 66 stops counting and advances a pulse along lead 80 to the second 300 position counter 42 and hence the variable pulse divider circuit is in effect a divide by $n$ circuit where $n$ is a number between 1 and 32 which has been preset in the selector unit 68.

Assume, for the purposes of illustration, that a 60 second traffic cycle is desired. The second 300 position counter 42 therefore must go through all 300 of its positions in 60 seconds or at the rate of 5 positions per second. To do this, counter 42 must receive 5 advance pulses per second from the clock pulse former 56 and thus, the variable pulse divider circuit 64 must provide five pulses per second on line 80. Therefore, the 60 pulses per second provided from the clock pulse former 56 must be reduced by a factor of 12. This is accomplished by setting control 74 so that selector unit 68 corresponds to the 12th position of the 32 position counter 66 and thus a signal will pass AND gate 76 only when counter 66 has counted to 12. Thus, each 12th clock pulse will pass to the second 300 position counter 42 and will then advance counter 42 at the rate of five positions per second. As was stated, the output 78 of AND gate 76 also serves to reset the 32 position counter 66 so as to enable it to start counting to 12 again after each advance pulse passed to the 300 position counter. It should be remembered that between each advance pulse to counter 42 there will be 80 cycle or reference producing pulses since for the example chosen the advance pulses occur at 1/5 second interludes and the cycle and reference wave producing pulses occur at 1/400 second intervals.

Since the second 300 position counter 42 is caused to advance at the rate of 5 pulses per second, it will go through its entire 300 positions in 60 seconds which is the desired traffic length. Also, since the accuracy with which power companies usually generate 60 cycle AC power is very great, the degree of accuracy with which the cycle line shifts will likewise be great.

Reference is now made to FIG. 5 and particularly to FIGS. 5b and 5c which respectively depict the second counter advance pulses 82 and the cycle wave producing pulses 46. Assume that the cycle wave producing pulses 46 on line 2 of FIG. 5b are originally in phase with the reference wave producing pulses 26 shown on line 1 of FIG. 5A. When the first advance pulse 82 to the second counter 42 is received, it will cause the counter 42 to advance so that coincidence between the first and second counters will occur when the first counter reaches its first position whereas before coincidence occurred at the zero position. The cycle wave producing pulses will thus shift 1/300 of 360° with respect to the reference wave producing pulses. When the next advance pulse 82a is received, the second counter 42 will advance to its second position and coincidence will occur when the first counter reaches its second position thus causing an additional shift of another 1/300 of 360° with respect to the reference wave producing pulses. Between advance pulse 82 and 82a there will be 80 cycle wave producing pulses since there is a time duration of 1/5 second. With each additional advance pulse 82 to the second counter, the phase of the cycle wave producing pulses relative to that of the reference wave producing pulses will shift by another 1/300 of 360° until the 300th advance pulse is received at which time the reference and cycle wave producing pulses will occur at the same time (and remain the same until the next advance pulse occurs 1/5th of a second later). In FIG. 5c the sinusoidal wave forms for the reference wave 30 and cycle wave 52 which represent the square waves of lines 5a and 5b properly filtered are shown. Because the second counter 42 advances in discrete steps the phase relationship between the cycle and reference waves will also shift in discrete steps.

As was previously mentioned, it is often necessary to synchronize the traffic cycle generated by one traffic control cycle generator with that generated by another similar traffic controller cycle generator. To this end a comparator circuit block 84 is provided as shown in FIG. 2 and adapted to receive inputs comprising the cycle wave energies desired to be brought into phase synchronization, namely, the present cycle wave energy 52 and the cycle wave energy 62 from the other controller. The comparator circuit 84 compares the two wave energies and is designed to vary the present cycle wave energy 52 by speeding up or slowing down the rate of clock pulses to the second 300 position counter 42 by varying the frequency of the AC wave energy 90 used to produce the advance pulses to the counter 42. This is accomplished by providing two variable oscillators 88 and 86, one adapted to increase the frequency of the AC wave energy 90 and the other adapted to reduce the frequency of AC wave energy 90. Oscillators 86 and 88 and wave energy 54 feed into gate 60 along with the output of the comparator block 84 so that the output 90 of gate 60 is a periodic wave energy the frequency of which will produce clock pulses at the necessary rate to gradually change the phase of the cycle wave 52 until it is in phase synchronization with cycle wave 62, at which point the gate 60 restores control to the 60 Hz. input 54. It should thus be apparent that the output 90 of gate 60 may be dependent on either the 60 cycle AC power line 54 or on either respectively the lower frequency or higher frequency oscillator 86 or 88 as determined by the comparator circuit 84.

In a similar fashion, the reference wave energy 30 may be brought into synchronization with the reference wave generated by some other cycle generator and in this regard a reference signal 92 may be used to set to zero the 10 position counters 34 and 36 of the first 300 position counter 24. This will synchronize the reference wave energizes to an accuracy within 1%. If an even greater accuracy is required, the three position counter 32 may also be set to zero by the reference synchronization signal 92 in which case an accuracy of ⅓ of 1% may be obtained in bringing the two reference waves into synchronization.

Reference is now made to FIGS. 3a and 3b wherein the logic circuitry for the divide by 300 blocks 24 and 42 and the gating matrix 44 is shown. Reference will also be made to FIG. 4 which comprises a simplified logic circuitry diagram for the gating matrix 44.

Divide by 300 block 24 includes a counter 32 adapted to isolate every third input pulse and to develop an output pulse 38 corresponding in time to every third input pulse 94 from oscillator 22. The output 38 of counter 32 forms the input to the first 10 position counter 34 the output 40 of which in turn forms the input to the second ten position counter 36. Similarly, the second 300 position counter 42 comprises a three position counter 96 the output 98 of which forms the input to a first ten position counter 100 which in turn has an output 102 which forms the input to a second ten position counter 104.

The three position counters 32 and 96 each include two JK flip flops which remain in their Q or "not Q" ($\overline{Q}$) state until they are switched by appropriate signals from the associated J or K gates. Flip flops 106 and 108 comprise three position counter 32 and flip flops 110 and 112 comprise three position counter 96. The input pulses to the three position counter 32 comprise the output 94 of the 120 kHz. oscillator 22 and the input 114 to the three position counter 96 comprises the output 80 of the variable pulse divider circuit 64.

If any one of the flip flops is in its Q state it will remain there until the associated K AND gate transmits a signal and, similarly, if any flip flop is in its $\overline{Q}$ state, it will remain there until its associated J AND gate transmits a signal. Each K AND gate is designed to transmit a signal when it receives a single input (since the other input to the AND gates is connected to the output of a grounded inverted amplifier 116) and each J AND gate is designed to switch the flip flop only when it receives a clock signal to its flip flop and two signals, one at each of its $J_1$ and $J_2$ terminals, it too having an input from the grounded inverted amplifier 116.

The Q output of each flip flop is fed back to its K AND gate. Thus, whenever, a flip flop is in its Q state, the end of the next clock input signal on line 94 will drive it to its $\overline{Q}$ state. Further, the $\overline{Q}$ output of each flip flop serves as a $J_1$ input to that same flip flop, while the Q outputs of flip flops 106 and 110 respectively serve as $J_2$ inputs to the J AND gates of flip flops 108 and 112, and the $\overline{Q}$ outputs of flip flops 108 and 112 serve as $J_2$ inputs to the AND gates of flip flops 106 and 110. With this wiring arrangement, there will be one Q output for any particular flip flop for every three inputs and the Q output 118 of flip flop 108 is thus used as the input 38 to the first ten position counter 34 of the first 300 position counter 24 since it represents the 120 kHz. signal 94 divided by 3 or a 40 kHz. pulsating signal. Similarly, the Q output 122 of flip flop 112 is used as the input 98 to the first 10 position counter 100 of the second 300 position counter 42 since it represents the output 114 of the pulse reduction circuit 64 divided by 3.

The ten position counters 34 and 36 of the first 300 position counter 24 and the ten position counters 100 and 104 of the second 300 position counter 42 operate in a fashion similar to that already described for the three position counters 24 and 42. Each ten position counter includes a gang of four JK flip flops so wired that there will be a Q output of one particular flip flop for every ten inputs to the counter. Thus, divide by 10 block 34 includes flip flops 124, 126, 128 and 130 wired to provide a decade counter such that every tenth input to the counter produces a Q output of flip flops 124. Thus, the Q output 132 of flip flop 124 comprises the input 92 to ten position counter 34 divided by 10 and the corresponding output 134 of divide by 10 block 100 comprises the output 98 of the second three position counter 96 divided by 10.

The output 132 of the first decade counter 34 of the 1st 300 position counter 24 comprises the input 40 to the second decade counter 36 and the output 134 of the 1st decade counter 100 of the second 300 position counter 42 comprises the input 102 to the second ten position counter 104 of the second 300 position counter 42. The second 10 position counters 36 and 104 of the 300 position counters are identical to the first ten position counters 34 and 100 and are thus depicted as comprising a portion of block 136 which would actually consist of a duplication of FIG. 3b. Thus, the output 26 of the 1st 300 position counter 24 is its input (the 120 kHz. signal 94) divided by 300 and the output of the 2nd 300 position counter 42 is its input (signal 114) divided by 300.

The gating matrix 44 which provides comparison circuitry between the corresponding individual positions of first and second 300 position counters is shown in FIGS. 3a and 3b as comprising blocks 138, 140 and 142. Circuits identical to those of blocks 140 and 142 also comprise a portion of block 136 which as was previously explained is a repetition of all of FIG. 3b except 136. Block 138 compares the positions of the three position counters 32 and 96 and blocks 140 and 142 compare the position of the first 10 position counters 34 and 100. Blocks similar to 140 and 142, but not shown, compare the positions of the second ten position counters 36 and 104.

Each of the comparator blocks has two outputs 144 and 146 which provide the zero and 50% points for the cycle wave and together comprise the input 46 to the square wave generator 48. A signal appears on output line 144 each time there is coincidence between all the positions of both three hundred position counters and a signal appears on line 146 at each time of coincidence and also at the midpoint (in time) between adjacent coincidences. The manner of generating signals 144 and 146 will be described forthwith in conjunction with FIG. 4.

Referring now to block 138 which compares the states of the flip flops forming the two three position counters 32 and 96, it is noted that block 138 includes: AND gate 148 the inputs to which comprise the Q output 150 of flip flop 106 and the Q output 152 of flip flop 110; AND gate 154 the inputs to which comprise the $\bar{Q}$ output 156 of flip flop 106 and the $\bar{Q}$ output 158 of flip flop 110; AND gate 160 the inputs to which comprise the $\bar{Q}$ outputs 162 and 164 of flip flops 108 and 112 respectively; and AND gate 166 the inputs to which comprise the Q outputs 168 and 170 of flip flops 108 and 112. Thus, whenever flip flops 106 and 110 are in the same state, a signal will pass to the inverted OR gate 172 and similarly when flip flops 108 and 112 are in the same state, a signal will pass to the inverted OR gate 174. The outputs 176 and 178 of gates 172 and 174 are then passed through the identical clamping diodes 180, 182, 184 or 186 and are combined so that identical signals appear on lines 144 and 146.

Comparator blocks 140 and 142 are provided associated with the ten position counters 34 and 100 and like block 138, blocks 140 and 142 comprise portions of the comparator gate matrix 44. The various AND gates comprising comparator blocks 140 and 142 are connected to the Q and $\bar{Q}$ outputs of the flip flops that comprise the first 10 position counter of each of the 300 position counters. Thus, AND gate 188 receives signals at its terminals when flip flops 128 and 128a are in their Q state and AND gate 190 receives signals at its terminals when flip flops 128 and 128a are in their $\bar{Q}$ state; AND gate 192 receives signals at its terminals when flip flops 126 and 126a are in their Q state and AND gate 194 receives signals when flip flops 126 and 126a are in their $\bar{Q}$ state; AND gate 196 receives signals at its terminals when flip flops 124 and 124a are in their Q state and AND gate 198 receives signals when flip flops 124 and 124a are in their $\bar{Q}$ states; and AND gate 200 receives signals at its input terminals when flip flops 130 and 130a are in their Q state and AND gate 202 receives signals at its terminals when flip flops 130 and 130a are in the $\bar{Q}$ states. The inputs to AND gates 190, 194, 198, and 202 are inverted by the inverted amplifier 204 and 206. Thus, gates 188 and 190 compare the states of flip flops 128 and 128a, AND gates 192 and 194 compare the states of flip flops 126 and 126a, AND gates 196 and 198 compare the states of flip flops 124 and 124a and AND gates 200 and 202 compare the states of flip flops 130 and 130a. The gates compare the states of their associated flip flops by transmitting signals only when the associated flip flops are in the same state.

The outputs of AND gates 188 and 190 feed into the inverted OR gate 208, similarly, the outputs of AND gates 192 and 194 feed into inverted OR gate 210, the outputs of gates 196 and 198 feed into inverted OR gate 212 and the outputs of gates 200 and 202 feed into inverted OR gate 210, the outputs of gates 196 and 198 feed into inverted OR gate 212 and the outputs of gates 200 and 202 feed into inverted OR gate 214. Thus, inverted OR gate 208 will receive and transmit a signal when flip flops 128 and 128a are in the same state, inverted OR gate 210 will receive and transmit a signal when flip flops 126 and 126a are in the same state, OR gate 212 will receive and transmit a signal if flop flops 124 and 124a are in the same state or OR gate 214 will receive and transmit a signal if flop flops 130 and 130a are in the same state. The output of OR gate 208 passes through clamping diodes 216 and 218, the output of OR gate 210 passes through diodes 220 and 222, the output of OR gate 212 passes through diodes 224 and 226 and the output of OR gate 214 passes through diodes 228 and 230. The outputs of diodes 216, 222, 224, and 228 are combined to form the zero percent point producing line 144 for the cycle wave, along with the outputs of diodes 180 and 184 of FIG. 3a. The outputs of diodes 218, 220, 226 and 230 are combined and form a part of the cycle wave producing line 146, along with the outputs of diodes 182 and 186 of FIG. 3a.

The comparator circuits associated with the second decade counters 36 and 104 of each 300 position counter are identical with the comparator circuits 140 and 142 (associated with the first decade counters 34 and 100) with the single exception that the output of inverted OR gate 214 is not fed into diode 230. In other words, the lead 232 between the points marked "U" and "Z" is removed for the comparator circuit between counters 36 and 104. As has been previously mentioned, counters 36 and 104 and the comparator circuit therebetween are depicted together as block 136. Thus, the signal contained on line 146 is independent of the condition of the flip flops 130 and 130a of counters 36 and 104 (i.e., the second ten position counter) so that the last divide by two position of each of the last decade counters is eliminated from the input to the square wave generator from line 146 and hence there will be twice the number of signals on line 146 as there will be on line 144.

Since cycle line 144 receives a signal each time each flip flop of the first 300 position counter is in a condition identical to the condition of the lower 300 position counter, it will receive 400 signals per second. Cycle line 146 will receive twice this number of signals and thus will receive 800 signals per second. Referring again to FIG. 2, it should be remembered that cycle lines 144 and 146 together define the input 46 to the square wave generator 48 and thereby cooperate in defining the starting and midway points for the square waves 234 produced by the square wave generator 48. The output 234 of the square wave generator 48 is then filtered through a suitable bandpass filter 5 to produce the desired sinusoidal cycle wave energy 52.

A simplified representation of the comparator circuit comprising gate 44 is illustrated in FIG. 4. As shown, the state of the individual flop flops 236 (a to j) comprising the 300 position counter 24 is compared with the state of the corresponding flip flops 238 (a to j) comprising the second 300 position counter 42 through AND gates 240 (a to j).

When two corresponding flip flops 236 and 238 are in the same state a signal appears on the output of the associated AND gate 240 which is inverted by the associated inverted 242 (a to j). The output of the various inverters form the input to the OR gate 244. Thus OR gate 244 will produce a negative going pulse each time all the inverters 242 generate negative signals and this will occur when both 300 position counters are in identical positions or 400 times each second. If any one AND gate 240 is not transmitting a signal at a particular moment, the output of its associated inverter will be positive signal causing a positive output of OR gate 244.

The output 246 of OR gate 244 is thus a series of negative going pulses occurring at a frequency rate of 400 pulses per second. The cycle generator must convert these pulses to a sinusoidal wave energy which may be compared with the sinusoidal wave energy comprising the reference wave 30. The method of converting the pulses of the comparator circuit into a cycle wave energy utilizes a circuit for determining the midway point between two adjacent pulses, generating a pulse at that time and then using the midway pulse and the original pulses as inputs to the square wave generator 48, to trigger the positive and negative portion of the square wave 234. The output of the square wave generator is then filtered through a suitable bandpass filter 50 to provide the desired sinusoidal wave form.

In accordance with the present invention, the midpoint between adjacent pulses is determined by passing the output of each inverter 242, with the exception of inverter 242j, to a second OR gate 248. This has the effect of comparing each bit of the divide by 300 counters except for the last bit of each counter so that the frequency of coincidence will be twice as great as where every bit is compared since one divide by two factor has been eliminated. Thus, OR gate 248 will produce twice the number of negative going pulses of OR gate 244 or 800 pulses per second. The spacing in time of the pulses of OR gate 244 will be twice that of the pulses of OR gate 248 and thus every other pulse generated by gate 248 defines the midpoint of adjacent pulses of gate 244. The outputs of OR gates 244 and 248 thus define the zero and 50% cycle lines 144 and 146 referred to in connection with FIG. 3. The information carried in lines 144 and 146 is then used to generate a square wave which subsequently is transformed into the desired sinusoidal wave form.

FIG. 6 shows the details of a preferred form of logic circuitry for the square wave generator 48 shown in block form in FIGS. 2 and 3b. The logic circuitry in FIG. 6 is shown in schematic form.

The input lines 144 and 146 at the left of FIG. 6 and the output line 155 at the right of FIG. 6 correspond with the lines bearing the same number throughout the various other views.

The line 144 in FIG. 6 bears the pulse output of the gate matrix 44 corresponding to the zero points in the cycle wave energy and in the example assumed for convenience would comprise pulses at substantially a 400 Hz. rate and are indicated in a pulse diagram above line 144 as relatively narrow negative going pulses. Thus for the assumed conditions the pulses on line 146, derived from all but the last binary stage in the gate matrix 44, comprise negative going pulses as indicated in the pulse diagram above the line, at the rate of substantially 800 Hz., and as more fully explained in the gating to be described in FIG. 6, these 800 Hz. pulses, which occur alternately at the same time as the 400 Hz. pulses and spaced halfway between the latter pulses, will serve to establish the 50% point for the period of the resulting square waves 234 at the output line 155.

Thus, at the zero point of the desired square wave, negative pulses arrive from both lines 144, 146 concurrently. Both of these pulses are inverted by the respective inverter amplifier stages 260, 262, and the pulse outputs of the latter are applied to the logic circuitry comprising the negative AND gate 264, the inverter amplifier 266 and the NOR gates 268, 270, which latter are cross-coupled to serve as a flip flop, the gates 264, 268 and 270 and the inverter amplifier 266 are being illustrated for example as part of integrated circuit block 274.

With the arrival of negative pulses on both lines 144, 146 as mentioned above, positive pulses are available at the outputs of stages 260 and 262. The positive pulse at the output of inverter stage 262 resets the flip flop 268, 270 so that its output on line 155 (wave 234) is low. The positive pulse output of stage 262 also applies its signal to the inverted input 276 of negative AND gate 264, thus inhibiting the latter so its output goes low.

The positive signal from the pulse output of inverter 260, under the conditions shown, is again inverted by the inverter 266, so that the negative output of the latter is applied to the inverted input 278 of gate 264, but this does not affect gate 264 at this time since it is inhibited by the signal at its other input 276 as just described.

At the 50% point or midway in the pulse period of the substantially 400 hz. pulses on line 144, a negative pulse appears on line 146 alone, the line 144 remaining at this moment at a high level. Since the line 144 is now at a high level, the output of inverter 262 is low, which releases the inhibited input at input 276 of AND gate 264. The output of inverter 260 has now become positive and the output of inverter 266 has become negative.

Since both inputs to gate 264 are now negative the output of this gate rises, setting the flip flop 268, 270 to its opposite condition so that its output becomes high, representing the high or more positive part of the square wave output 234.

Since this negative input pulse on line 146, without the negative pulse on line 144, represents the 50% point of the pulse repetition period, that is halfway through the count of the lower counter in FIG. 2, FIGS. 3a–3b, it represents the midpoint in the repetition period of the square wave output 234 desired and this point is identified by the presence of the negative pulse on line 146 without any negative pulse on line 144.

In between these negative pulses when both lines 144, 146 are at a high level, the inverted outputs of inverter amplifiers 260, 262 will both be low, so that the input to NOR gate 270 will be low, and the further inverted output of inverter 266 will be high. Since the input 278 of the inverted input AND gate 264 will be high under this condition, the input to the NOR gate 268 will be low so that the flip flop comprising NOR gates 268, 270 will remain in whichever condition it has previously been set or reset until the high level condition of both input lines 144, 146 is ended by another negative pulse as described above.

Thus, in accordance with the present invention, a cycle generator has been described which is adapted to produce two single phase wave energies of identical frequencies one wave energy being adapted to shift in phase with respect to the other. The cycle generator is designed to be used with apparatus well known in the art adapted to respond to coincidences of the two wave energies. The frequency of the coincidences may be altered by varying the rate at which the cycle wave energy shifts in phase with respect to the reference wave and the rate of shifting may readily be synchronized with other similar cycle generators.

Although the term "identical frequencies" has been used in the present application to denote the relationship between the reference wave energy and the cycle wave energy, it should be appreciated that during the course of one complete traffic cycle the cycle wave energy will have lost one complete wave, as compared to the reference wave energy, and thus the average frequencies are not literally identical.

Having thus described the invention, what we claim is:

1. A cycle generator for generating the time period determined by the phase coincidence of two single phase wave energies adapted to provide a signal control traffic cycle in a traffic control system comprising in combination:

means for generating a first single phase sinusoidal wave energy from a pulsating energy source including a first recycling multiposition counter adapted to reduce the rate of pulses from said pulsating energy source by utilizing said pulses to advance the position of said counter and to generate an output signal only when a particular position of said counter is reached;

means for generating a second single phase sinusoidal wave energy including means for shifting the phase of said second wave energy in incremental steps, said last referenced means including a second recycling multiposition counter and a comparator circuit, said comparator circuit being adapted to generate a first output signal each time said first and said second multiposition counters are in corresponding positions and a second output signal at the substantial midpoint between two adjacent first output signals, and filter means adapted to filter said comparator circuit output so as to form a sinusoidal wave energy wherein said first and said second counter circuit output signals define alternative positive and negative portions of said wave energy; and means for controlling the rate at which the phase of said second wave energy shifts with respect to said first wave energy.

2. The invention in accordance with claim 1 wherein said means for shifting the phase of said second wave energy relative to said first wave energy includes means for advancing the position of said second counter and thereby advancing the position in said counter at which coincidence between said first and second counter will occur thereby delaying in time the point at which said second wave producing signals will be generated relative to the time at which said first wave producing signals will be generated.

3. The invention in accordance with claim 1 wherein said first and said second recycling multiposition counters include equal pluralities of cascaded bistable flip flops and said comparator circuit includes means for comparing the state of corresponding pairs of flip flops of said first and said second counters and to generate a signal when said corresponding pairs of flip flops are in the same state wherein said first comparator circuit output signal is generated when each of said corresponding pairs of flip flops are in the same state and said second comparative circuit output signal is generated when all but the last of said corresponding pairs of flip flops are in the same position.

4. The invention in accordance with claim 3 wherein said filter means includes a square wave generator, the output of which is a wave energy having a negative portion and a positive portion and said comparator circuit first output signal triggers one of said portions and said comparator circuits second output signal triggers the other of said portions.

5. The invention in accordance with claim 2 wherein said means for controlling the rate of phase shift includes means for generating advanced pulses to said second counter at a variable rate and said last referenced means includes a periodic pulse source.

6. The invention in accordance with claim 5 wherein said periodic pulse source is a 60 Hz. AC power line.

7. The invention in accordance with claim 5 further comprising:
means for controlling the number of pulses from said periodic pulse source that advance the second counter wherein said control means comprises a third multiposition counter adapted to receive said periodic pulses, to advance in position with each such periodic pulse, and to pass an advance pulse to said periodic counter when said third counter reaches a predetermined position;
a variable means for selecting the predetermined position of said third counter; and
feedback means for returning said third counter to zero after said predetermined position is reached by said third counter and an advance pulse is transmitted to said second counter.

8. The invention in accordance with claim 5 further comprising:
means for synchronizing the phase of said second wave energy with the phase of the second wave energy of another similar cycle generator including means for comparing the phase in the present cycle generator with the phase of said other cycle generator;
a first fixed frequency synchronization oscillator, the frequency of which is greater than the frequency of said periodic pulses;
a second fixed frequency synchronization oscillator, the frequency of which is less than the frequency of said periodic pulses; and
gating means for choosing between said periodic pulses, said first synchronization oscillator and said second synchronization oscillator in accordance with the output of said comparator circuit whereby said first synchronization oscillator is utilized to advance said third multi-position counter if the phase of said other cycle generator leads the phase of the present cycle generator, said second synchronization oscillator is utilized to advance said third counter if the phase of said other cycle generator lags the phase of the present cycle generator, and said periodic pulses are utilized to advance said third multi-position counter if said other cycle generator is in phase with the present cycle generator.

References Cited

UNITED STATES PATENTS

| | | | |
|---|---|---|---|
| 2,466,044 | 4/1949 | Schoenfeld | 328—155X |
| 2,469,155 | 5/1949 | Bussey | 328—155 |
| 3,059,175 | 10/1962 | Hodgson | 328—155X |
| 3,112,451 | 11/1963 | Collins | 328—155 |
| 3,149,306 | 9/1964 | Lesher | 340—41 |
| 3,257,642 | 6/1966 | Lazerges | 340—41 |
| 3,299,401 | 1/1967 | Bolton | 340—41 |
| 3,316,503 | 4/1967 | Lenz | 307—262X |
| 3,354,410 | 11/1967 | Beuscher | 307—262X |
| 3,482,171 | 12/1969 | Himes et al. | 328—110X |

STANLEY T. KRAWCZEWICZ, Primary Examiner

U.S. Cl. X.R.

307—262; 328—25, 27, 74, 110, 129, 133; 340—41